United States Patent [19]
Takagi et al.

[11] Patent Number: 5,269,998
[45] Date of Patent: Dec. 14, 1993

[54] METHOD OF FORMING FERRULE FOR AN OPTICAL FIBER CONNECTOR AND A MOLD THEREFOR

[75] Inventors: Koichi Takagi; Takashi Shigematsu; Takahide Kimura; Seiichi Imamizo, all of Ichihara, Japan

[73] Assignee: The Furukawa Electric Co., Ltd., Tokyo, Japan

[21] Appl. No.: 887,012

[22] Filed: May 22, 1992

[30] Foreign Application Priority Data

May 24, 1991 [JP] Japan .................. 3-149877

[51] Int. Cl.⁵ .............................. B29C 45/36
[52] U.S. Cl. .................. 264/328.1; 249/144;
   249/148; 425/577; 425/589; 425/450.1;
   425/468
[58] Field of Search ............ 264/328.1; 425/577,
   425/589, 468, 450.1; 249/63, 142, 144, 146, 147,
   148

[56] References Cited
U.S. PATENT DOCUMENTS 4,342,549 8/1982 Lemelson .................. 425/468
4,649,616 3/1987 Bricker .
4,711,752 12/1987 Deacon et al. .................. 425/468

FOREIGN PATENT DOCUMENTS

0110140 6/1984 European Pat. Off. .
0160312 6/1985 European Pat. Off. .
1-27401 5/1989 Japan .
WO91/06412 5/1991 PCT Int'l Appl. .

Primary Examiner—Jill L. Heitbrink
Attorney, Agent, or Firm—Staas & Halsey

[57] ABSTRACT

A method of molding a ferrule of plastic resin provided with at least one hole having a small diameter and positioned at a predetermined position by a mold having a pair of associated molding ferrule halves, including the steps of arranging a molding core having at least one pin for defining the hole in a cavity defined by the pair of molding ferrule halves, holding the molding ferrule halves by a clamping force, the molding ferrule halves having inner members for positioning the pin and being free from the clamping force, supplying plastic resin into said cavity and pressing the inner members of the molding ferrule halves by a force separate from the mold clamping force.

15 Claims, 10 Drawing Sheets

METHOD OF FORMING FERRULE FOR AN OPTICAL FIBER CONNECTOR AND A MOLD THEREFOR

BACKGROUND OF THE INVENTION

1. Field of the Invention

The present invention relates to a method of molding a ferrule and a mold therefor, and more particularly, to a method of molding a ferrule for an optical fiber connector, an optical fiber switch or the like, using plastic resin, and a mold therefor.

2. Description of the Related Art

Optical fibers of glass comprise a core having a diameter of 10 μm, a cladding formed on an outer surface of the core and having a diameter of 125 μm, and a protective cover of resin surrounding the cladding.

Ferrules for optical fiber connectors which connect both ends of optical fibers must be manufactured precisely to meet the ends of the optical fibers. The ferrules are formed by molding using a fluid plastic resin having a high temperature of approximately 180 degrees centigrade and employing a high injection pressure.

Figure 1:
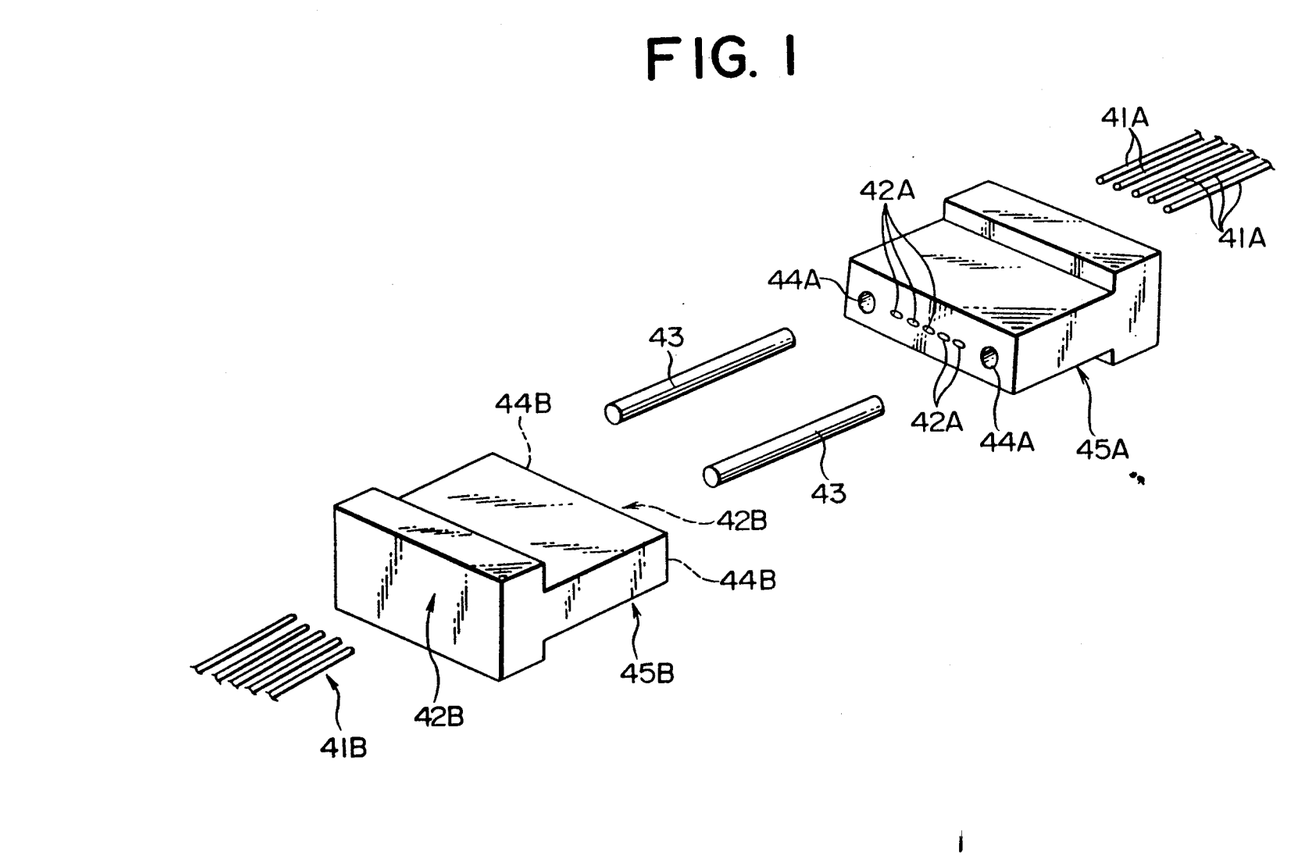
FIG. 1 is a perspective view of a pair of ferrules for an optical fiber connector.

More specifically, as shown in FIG. 1, a ferrule 45A of a half of an optical fiber connector is provided with a plurality of fiber holes 42A into which a plurality of optical fibers 41A are inserted, and another ferrule 45B of the other half of the optical fiber connector has a structure same as the ferrule 45A. Two fitting pins 43 are inserted into pin holes 44A and 44B to integrate the halves, to thereby assemble the optical fiber connector. The optical connector is formed by inserting the optical fibers 41A and 41B into the fiber holes 42A and 42B and fixing the halves thereat by an adhesive.

The ferrules 45A and 45B of the optical fiber connector are produced by injection-molding or transfer-molding using plastic material. The mold for producing the ferrules 45A and 45B is comprised of a pair of molding ferrule halves which are openable and closable. Molding cores provided with pins for forming the fiber holes 42A and 42B and other pins for the pin holes 44A or 44B, are arranged in a cavity defined between abutting end faces of the molding ferrule halves, and are held and fixed thereat using the clamping force applied to the pair of molding ferrule halves. In this state, plastic resin is supplied into a cavity, resulting in the formation of desired ferrule 45A or 45B.

When holding and fixing the molding cores in place using the molding clamping force, it is necessary to firmly fix the molding cores from both the top and bottom sides without any clearance so as to precisely hold the molding cores at a fixed position without looseness.

However, when forming the ferrule 45A or 45B, plastic resin is supplied to the cavity at a high pressure of several hundred kg/cm², for example, to reduce the shrinkage and deformation of the molding resin and to maintain a size. Therefore, to overcome the pressure due to the plastic resin, it is necessary to clamp the molding ferrule halves with a large molding clamping force of, for example, several tens of tons but, if this large mold clamping force is applied directly to the molding cores, the problem may occur of damage to the pins of the molding cores (Japanese unexamined publication No. 55-36809 published on Mar. 14, 1980).

SUMMARY OF THE INVENTION

An object of the present invention is to provide a method of forming a ferrule and a mold therefor by which a ferrule with a high quality can be produced.

Another object of the present invention is to provide a method of forming a ferrule and a mold therefor by which the ferrule can be manufactured in large quantities.

According to the present invention, there is provided a method of molding a ferrule of plastic resin provided with at least one hole having a small diameter and positioned at a predetermined position by a mold having a pair of associated molding ferrule halves, comprising the steps of arranging a molding core having at least one pin for defining the hole in a cavity defined by the pair of molding ferrule halves, holding the molding ferrule halves by a clamping force, the molding ferrule halves having inner members for positioning the pin and being free from the clamping force, supplying plastic resin into said cavity and pressing the inner members of the molding ferrule halves by a force free from the mold clamping force.

Preferably, the pressing is carried out by a force generated by a member which generates the force in response to electric power, an elastic member, a pressurized fluid, a compressed gas, or, an electromagnet.

According to the present invention, there is provided a mold for forming a ferrule provided with at least one hole having a small diameter and positioned at a predetermined position, comprising a pair of associated molding ferrule halves having inner members for positioning a pin for forming the hole, at least one molding core disposed in a cavity defined by the pair of molding ferrule halves which are held by a clamping force, the inner members being free from the clamping force, plastic resin for forming the ferrule being supplied to the cavity and a pressing means for applying to the inner members a force separate from the clamping force.

Preferably, the pressing means comprises a member which generates the force in response to electric power, an elastic member, a pressurized fluid, a compressed gas, or, an electromagnet.

Preferably, the pin holders are positioned by a groove having at least one inclined surface, such as a V-shaped surface, or a trapezoid, and the groove is communicated with the pressing means for applying the holding force of the pin separate from the mold clamping force.

Specifically, the ferrule is used for an optical fiber connector, an optical fiber switch or the like, and the hole having a small diameter is formed to fit an optical fiber thereinto.

BRIEF DESCRIPTION OF THE DRAWINGS

The above and other objects and the above and other features of the present invention will be described in detail with reference to the accompanying drawings, in which.

DESCRIPTION OF THE PREFERRED EMBODIMENTS

An embodiment of a mold for forming a ferrule which can be used for an optical fiber connector, will be described with reference to FIGS. 2 to 6.

Figure 2:
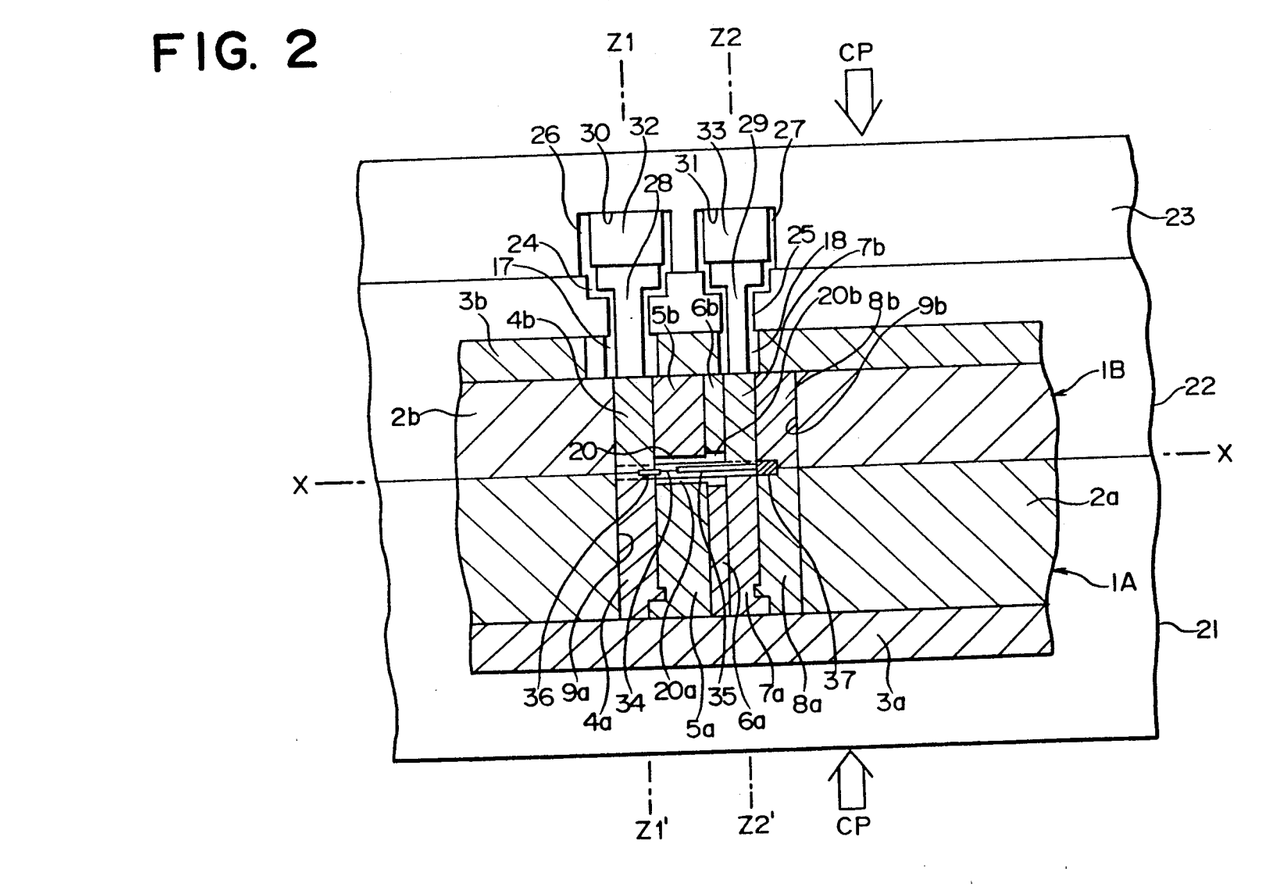
FIG. 2 is a sectional view of a first embodiment of a mold according to the present invention.
Figure 3:
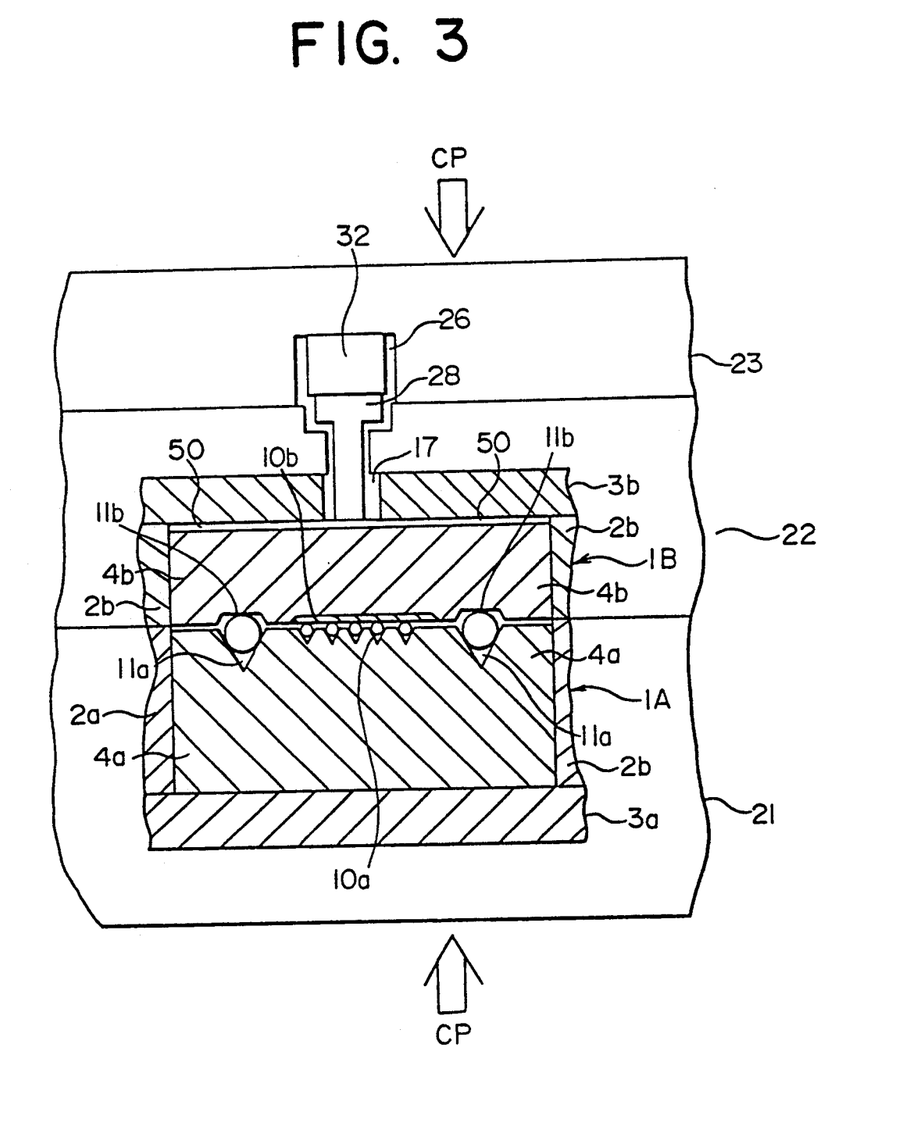
FIG. 3 is a sectional view of the mold shown in FIG. 2, taken along the lines Z1-Z1'.

In FIGS. 2 and 3, a mold is comprised of a molding ferrule half 1A and another molding ferrule half 1B which are accommodated in a movable mold 21 and a stationary mold 22. A push plate 23 is mounted on the stationary mold 22. Portions 20a and 20b are defined between the molding ferrule halves 1A and 1B, and communicated and connected to each other to define a common cavity 20.

Molding cores 34 and 35 are placed in the common cavity 20.

Figure 6:
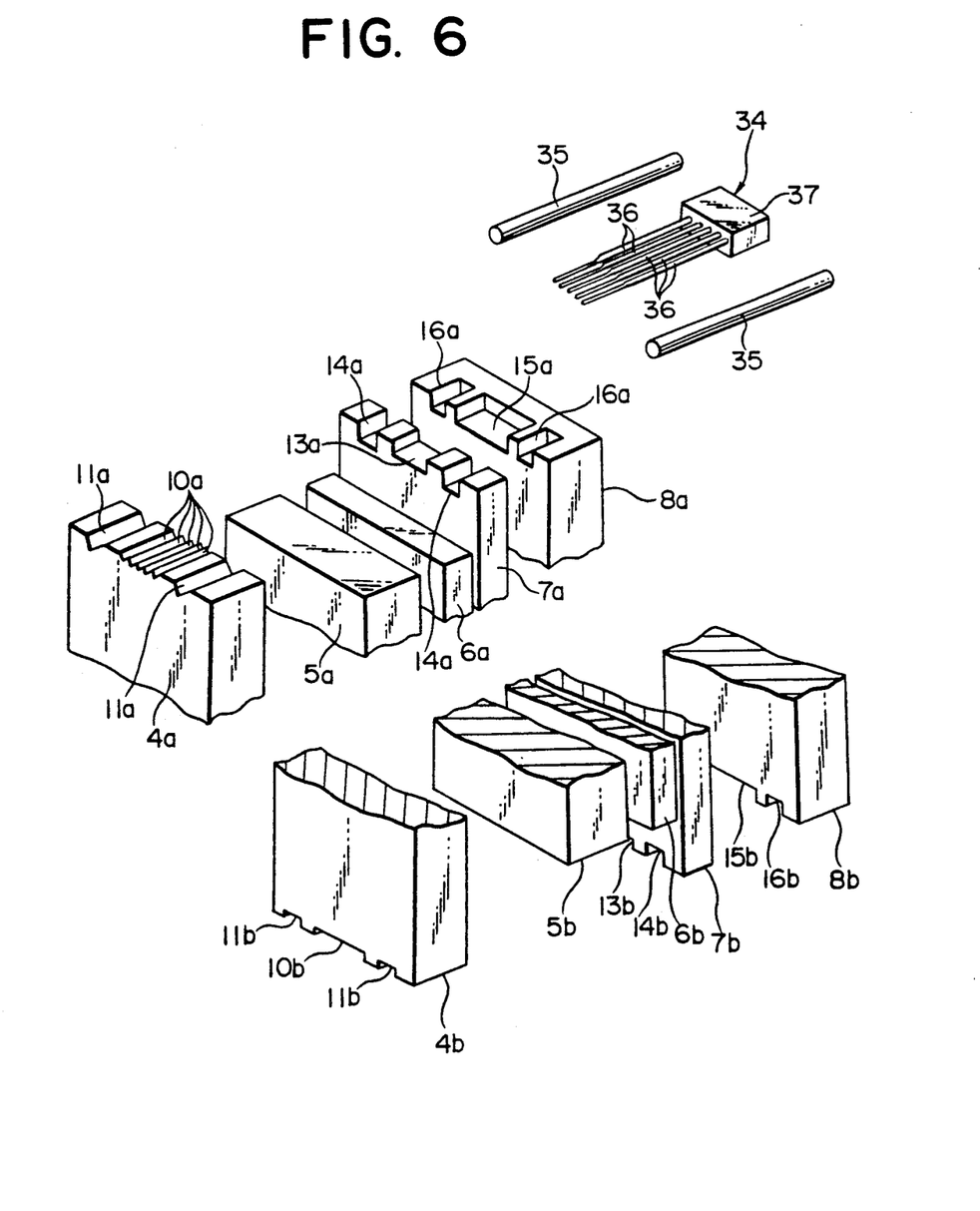
FIG. 6 is a disassembled perspective view showing major components of the mold.

As shown in FIGS. 1 and 6, a first molding core 34 consists of a plurality of thin pins 36 for defining the optical fiber holes 42A in the ferrule 45A, and a fixing block 37 for fixing the pins 36. Second molding cores 35 are pins used for defining the holes 44A of the ferrule 45A.

The molding ferrule half 1A is comprised of a combination of a plurality of mold components (inner molding members) 2a, 3a, 4a, 5a, 6a, 7a, and 8a, while the another molding ferrule half 1B is comprised of a combination of a plurality of mold components (inner molding members) 2b, 3b, 4b, 5b, 6b, 7b, and 8b. The inner molding members are contained within a space or cavity 50 formed by the insides of the molding ferrule halves 1A and 1B.

These mold components 2a to 8a and the mold components 2b to 8b may be comprised of different materials selected from metals and ceramics. Each pair of components, however, are comprised of the same material. As a specific example, the mold components 4a and 4b, which position the pins 36 and pins 35 in place and are free from the clamping force, are comprised of cemented carbide. The mold components other than the mold components 4a and 4b are comprised of hardened steel (die steel).

FIG. 3 is a view of the mold taken along the lines Z1 and Z1' in FIG. 2. In FIGS. 2 and 3, the molding ferrule half 1A includes the mold component 4a, and the molding ferrule half 1B includes the mold component 4b. The mold component 4a and the mold component 4b cooperate with each other to position the pins 36 of the first molding core 34 and the pins 35 as the second molding core. Note, the mold component 4a is fixed, but the mold component 4b is movable and pressed by the piezoelectric element 32. When pressing the mold component 4b by the piezoelectric element 32, the space 50 is shown between the mold component 4b and the plate 3b.

The mold components 7a and 7b, as shown along the lines Z2-Z2' in FIG. 2, are similar to the mold components 4a and 4b.

Note that the clamping force CP is applied to the molding ferrule halves 1A and 1B, but the mold component 4b and the mold component 7b are not subjected to the clamping force CP but are subject only to forces from the piezoelectric elements 32 and 33, respectively.

In the molding ferrule half 1A, the mold component 2a is formed as a base plate, the mold component 3a is formed as a closing plate, and the remaining mold components 4a to 8a are formed as blocks. In the same way, in the molding ferrule half 1B, the mold component 2b is formed as a base plate, the mold component 3b is formed as a closing plate, and the remaining mold components 4b to 8b are formed as blocks.

Figure 4:
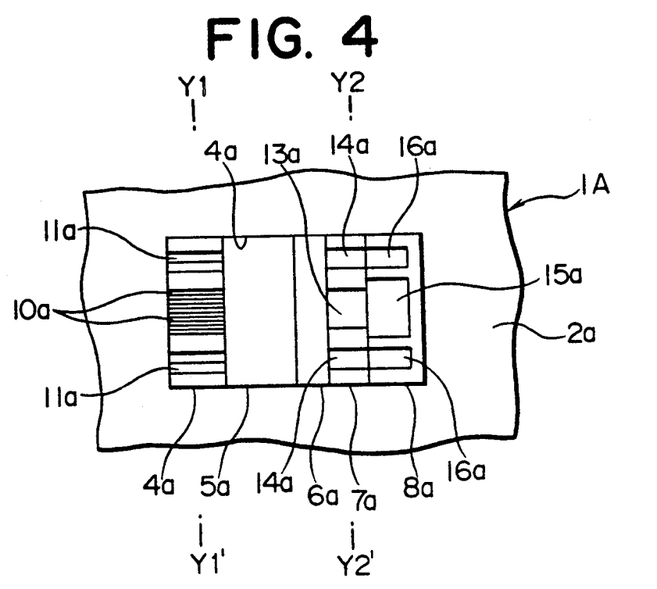
FIG. 4 is a top view of a molding ferrule half of the mold shown in FIG. 2.

On the surface of the mold component 2a, an opening 9a serving as a pocket is formed. The bottom of the opening 9a is closed by the mold component 3a. The mold components 4a, 5a, 6a, 7a, and 8a are accommodated in the opening 9a in line. At the center of the top surface of the mold component 4a and at the two sides of the top surface, V-shaped molding core holding portions 10a and 11a are formed. The top surface of the mold component 5a is formed as a flat surface which is lower than the top end face of the mold component 4a. The top end face of the mold component 6a is also formed as a flat surface which is slightly lower than the top end face of the mold component 5a. At the center of the top surface of the mold component 7a and at the two sides of the top surface, concave core grooves 13a and 14a are formed. Further, at the center of the top surface of the mold component 8a and at the two sides of the top surface, concave core holding portions 15a and 16a are formed.

Figure 5:
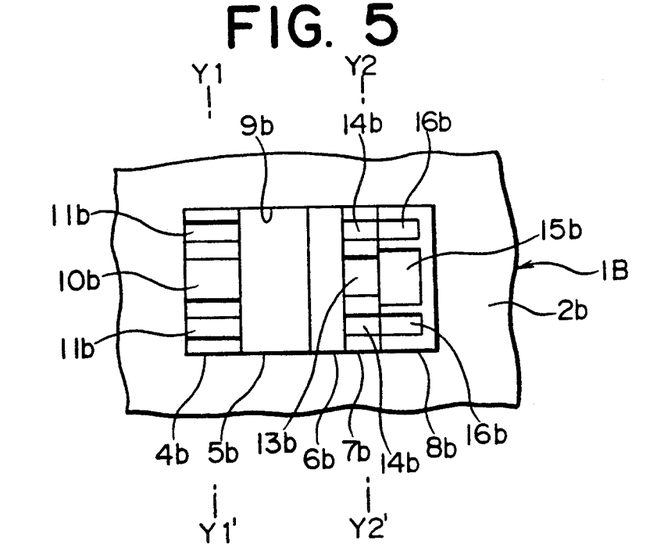
FIG. 5 is a bottom view of the other molding ferrule half of the mold shown in FIG. 2.

At the surface of the mold component 2b, an opening 9b serving as a pocket is formed, and the mold components 4b, 5b, 6b, 7b, and 8b are accommodated in the opening 9b in line. At the center of the bottom surface of the mold component 4b and at the two sides of the bottom surface, the core holding portions 10b and 11b are formed, respectively. The bottom surface of the mold component 5b is formed as a flat surface which is positioned higher than the bottom surface of the mold component 4b. Further, the bottom surface of the mold component 6b is also formed as a flat surface, of which flat surface is positioned slightly above the bottom surface of the mold component 5b.

The bottom surface of the mold component 7b lies at the same level as the bottom surface of the mold component 4b. At the center of the bottom surface of the mold component 7b and at the two sides of the bottom surface, concave core grooves 13b and 14b are formed, respectively. At the center of the bottom surface of the mold component 8b and at the two sides of the bottom surface, concave core holding portions 15b and 16b are formed, respectively. The mold component 3b is placed to abut against the top surface of the mold component 2b. Insertion holes 17 and 18 are formed in the mold component 3b at a position facing the mold components 4b and 7b.

When assembling the molding ferrule half 1A by the above-mentioned mold components 2a to 8a, the mold component 3a is placed so as to abut it against the bottom surface of the mold component 2a, the mold components 2a and 3a are clamped with each other by a screw fastening means, and the mold components 4a to 8a are inserted into the opening 9a of the mold component 2a in a predetermined arrangement, to thereby construct the molding ferrule half 1A. The resultant molding ferrule half 1A has a recess position 20a defining the cavity 20.

When assembling the molding ferrule half 1B by the above-mentioned mold components 2b to 8b, the mold component 3b is placed so as to abut it against the bottom surface of the mold component 2b, the mold components 2b and 3b are clamped each other by a screw fastening means, and the mold components 4b to 8b are inserted into the opening 9b of the mold component 2b in a predetermined arrangement, to thereby construct the molding ferrule half 1B. The resultant molding ferrule half 1B has another recess 20b defining the cavity 20.

In the assembled molding ferrule halves 1A and 1B, the mold components 4a and 4b, the mold components 5a and 5b, the mold components 6a and 6b, the mold components 7a and 7b, and the mold components 8a and 8b are positioned correspondingly to each other vertically, and the mold components 4a and 4b and the mold components 7a and 7b function as pin holders of the molding cores. The molding ferrule half 1A is mounted on the movable mold 21, while the molding ferrule half 1B is mounted on the stationary mold 22, the push plate 23 is fixed. The stationary mold 22 further has through holes 24 and 25 formed at positions corresponding to the insertion holes 17 and 18 and has concave holes 26 and 27 formed at the bottom of the push plate 23 facing to the through holes 24 and 25. The pressing pin 28 is inserted in the insertion hole 17 and the through hole 24. The top surface of the mold component 4b is placed to abut against the bottom surface of the pressing pin 28. A piezoelectric element 32 is placed between the top end of the pressing pin 28 and the bottom surface 30 of the concave hole 26. The piezoelectric element 32 and the pressing pin 28 constitute a pressing means for pressing the mold component 4b downward.

Similarly, a pressing pin 29 is inserted into the insertion hold 18 and the through hole 25. The bottom surface of the pressing pin 29 is placed to abut against the top end of the mold component 7b. A piezoelectric element 33 is placed between the top end of the pressing pin 29 and the bottom surface 31 of the concave hole 27. The piezoelectric element 33 and the pressing pin 29 constitute a pressing means for pressing the mold component 7b downward. Note that a voltage applying means, not shown, is connected to the piezoelectric elements 32 and 33.

The molding core 34, as will be clear with reference to FIG. 6, is comprised of a plurality of thin pins 36, each having a small diameter and arranged in parallel at equal distances and a connecting member 37 which connects the base portions of the thin pins 36 to integrate them. The tips of the thin pins 36 are extremely small in diameter corresponding to the outer diameter of the optical fibers. The connecting member 37 is formed of die steel or the like while the thin pins 36 are formed of a metal material or the like which can be precisely worked.

The molding core 35, as shown in FIG. 5, is molded as a pin. The molding core 35 has an outer diameter corresponding to the fitting pins 43 shown in FIG. 1. The molding core 35 is also formed of a metal material or the like which can be precisely worked.

The movable mold 21 and the stationary mold 22 shown in FIG. 2 can, as is well known, be moved relative to each other in the mold opening and closing direction. The molding ferrule half 1A is mounted on the movable mold 21, and the molding ferrule half 1B is mounted on the stationary mold 22, in this state, the thin pins 36 and the connecting member 37 of the molding core 34 are fitted in the core holding portions 10a, 13a and 15a, and the two ends of the molding core 35 are fitted in the core holding portions 11a, 14a and 16a.

When the molding ferrule halves 1A and 1B are clamped to each other, the thin pins 36 and the connecting member 37 of the molding core 34 are forcibly stopped by the core holding portions 10b and 13b and the two ends of the molding core 35 are forcibly stopped by the core holding members 11b and 14b.

In this case, the tips of the pins of the molding cores 34 and 35 are gripped between the mold components 4a and 4b. When voltage is applied to the piezoelectric element 32 to expand the piezoelectric element 32, the resultant expansion force is transmitted to the mold component 4b through the pressing pin 28, so that the tips of the pins of the molding cores 34 and 35 are held by the optimum force which prevents looseness and damaging of the pins. Similarly, the ends of the bases of the pins of the molding cores 34 and 35 are gripped by the mold components 7a and 7b. When voltage is applied to the piezoelectric element 33 to expand the piezoelectric element 33, the resultant expansion force is transmitted to the mold component 7b through the pressing pin 29, so that the ends of the bases of the pins of the molding cores 34 and 35 are held between the mold components 7a and 7b by the optimum force which prevents looseness and damaging of the pins. By varying the magnitudes of the voltages applied to the piezoelectric elements 32 and 33, the holding force of the pins of the molding cores 34 and 35 are adjusted, and the amount of deformation due to expansion and contraction of the piezoelectric elements 32 and 33 is changed, and thus, the holding force of the pins of the molding cores 34 and 35 can be controlled.

As a result, the two molding cores 34 and 35 are held between the clamping surfaces of the two clamped molding ferrule halves 1A and 1B, and correctly disposed at fixed positions in the cavity 20 defined by the recesses 20a and 20b.

Note that known gates and runners (not shown) are formed at the clamping surfaces of the two molding ferrule halves 1A and 1B. The known gates and runners (not shown) provided in the movable mold 21 and the stationary mold 22 or the like, are communicated with each other.

Further, when the movable mold 21 is provided with ejector pins for ejecting the two molding cores 34 and 35, the molded article or the like, through holes (not shown) for the ejector pins are formed in predetermined mold components in the molding ferrule half 1A.

According to the first embodiment, the molding ferrule halves 1A and 1B which are heated to a predetermined molding temperature, are clamped to each other, and thereafter, a fluid and high temperature plastic material (heat curing resin or thermoplastic resin) is injected into the cavity 20, to thereby form a predetermined mold article, that is, the optical fiber connector ferrule 45 shown in FIG. 1.

During the molding process, the pins of the molding cores 34 and 35 are held by the holding force generated by the pressing means free from the mold clamping force, that is, by the piezoelectric elements 32 and 33, so that an excessive force is not applied to the pins and there does not arise the problem that the pins are damaged by an excessive force.

A second embodiment of a mold according to the present invention will be described with reference to FIG. 7.

Figure 7:
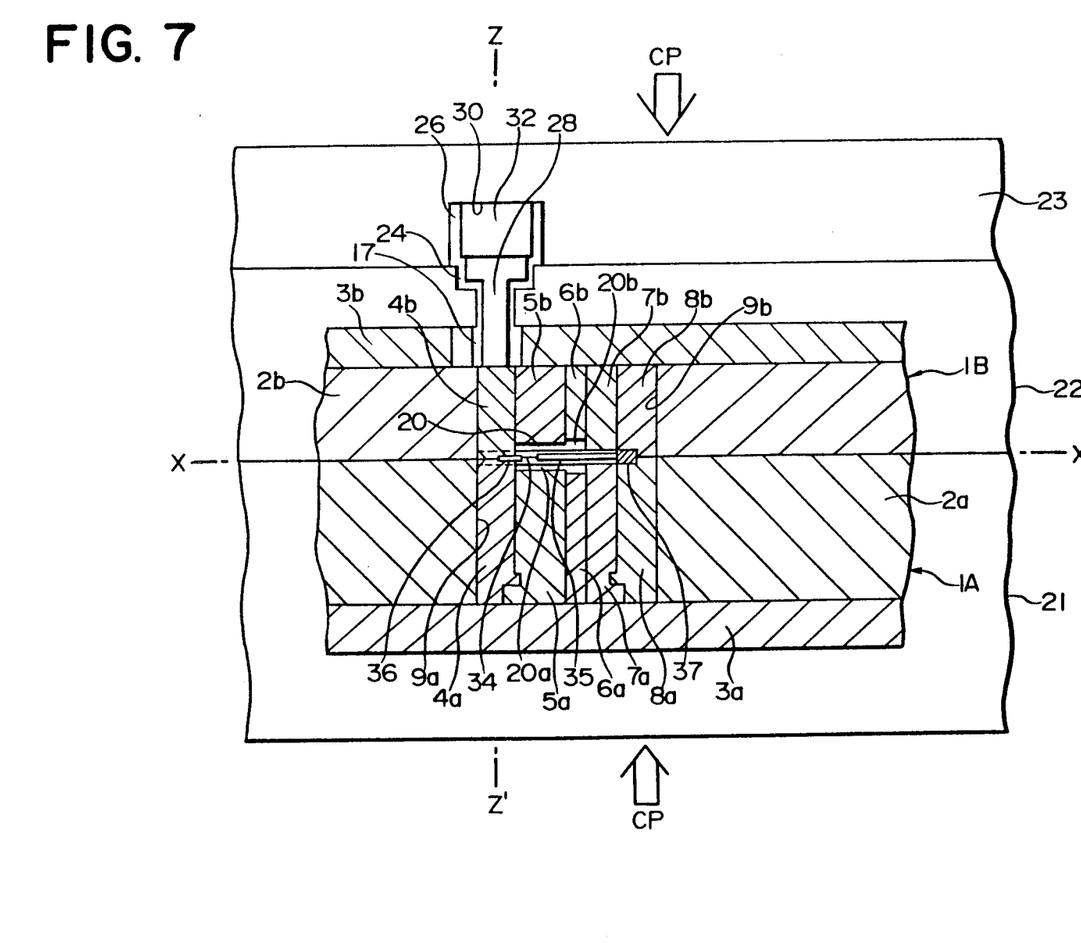
FIG. 7 is a sectional view of a second embodiment of a mold according to the present invention.

FIG. 7 is a sectional view of the mold corresponding to that of FIG. 2. In this mold shown in FIG. 7, the insertion hole 18, the through hole 25, the pressing pin 29 and the piezoelectric element 33, which are shown in FIG. 2, are removed, and consequently, the injection of the plastic resin is carried out through resin injection holes (not shown), and the pressing is carried out by the piezoelectric element 32 and the pressing pin 28. The mold shown in FIG. 7 acts the same as the mold shown in FIG. 2, to thereby produce the ferrule.

A third embodiment of a mold according to the a present invention will be described with reference to FIG. 8.

Figure 8:
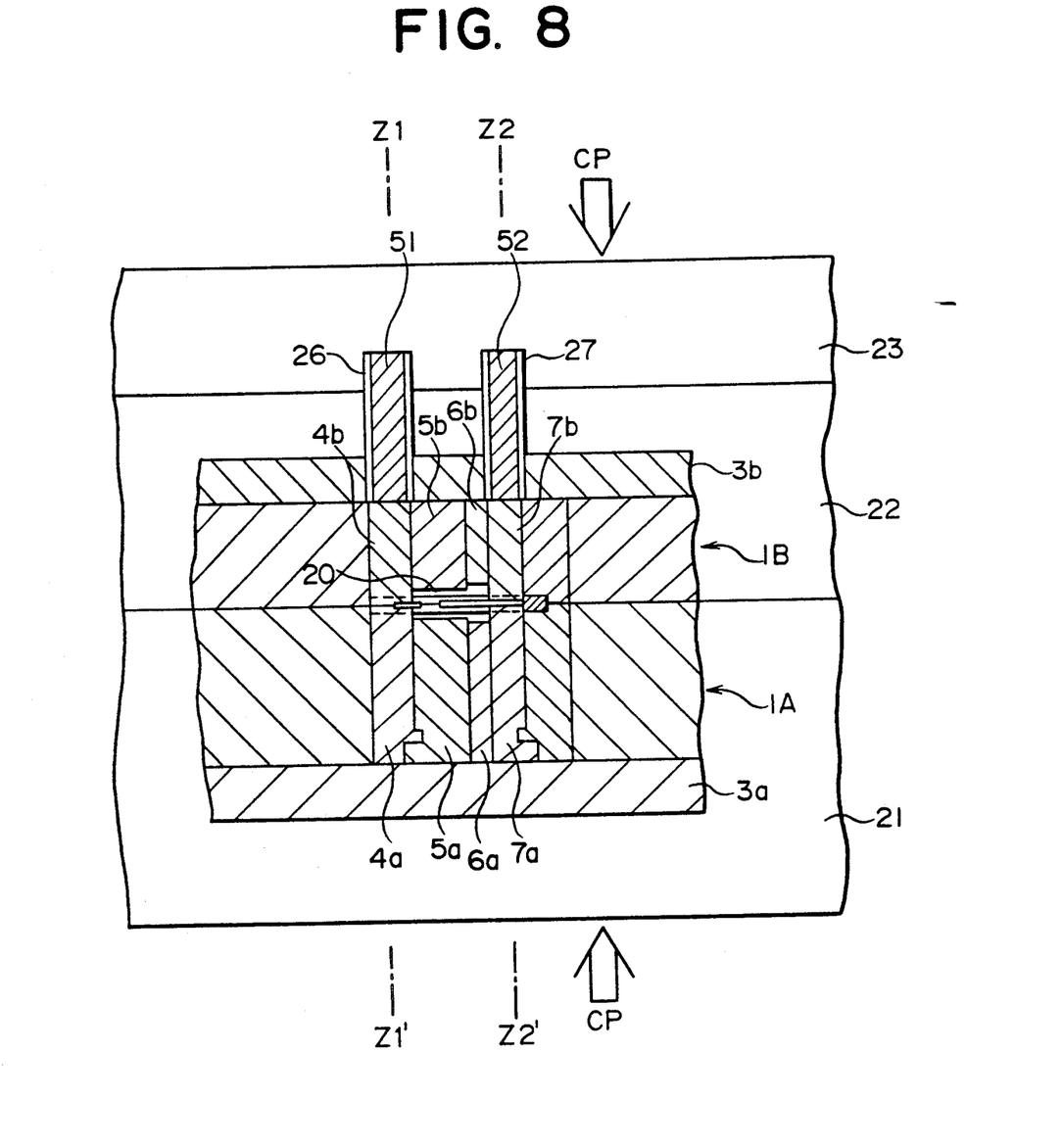
FIG. 8 is a sectional view of a third embodiment of a mold according to the present invention.

FIG. 8 is a sectional view of the mold corresponding to that of FIG. 2. In this mold, the pressing pins 28 and 29 shown in FIG. 2 are removed, and springs 51 and 52 are inserted into the holes 26 and 27 instead of the piezoelectric elements 32 and 33 as shown in FIG. 2. The springs 51 and 52 press directly against the molding components 4b and 7b.

Alternatively, other elastic members for generating the force for pressing the molding component 4b and 7b, such as rubber sheets, can be applied instead of the springs 51 and 52.

As seen from the second embodiment as shown in FIG. 7, the spring 52 or the corresponding rubber sheet can be removed.

A fourth embodiment of a mold according to the present invention will be described with reference to FIG. 9.

Figure 9:
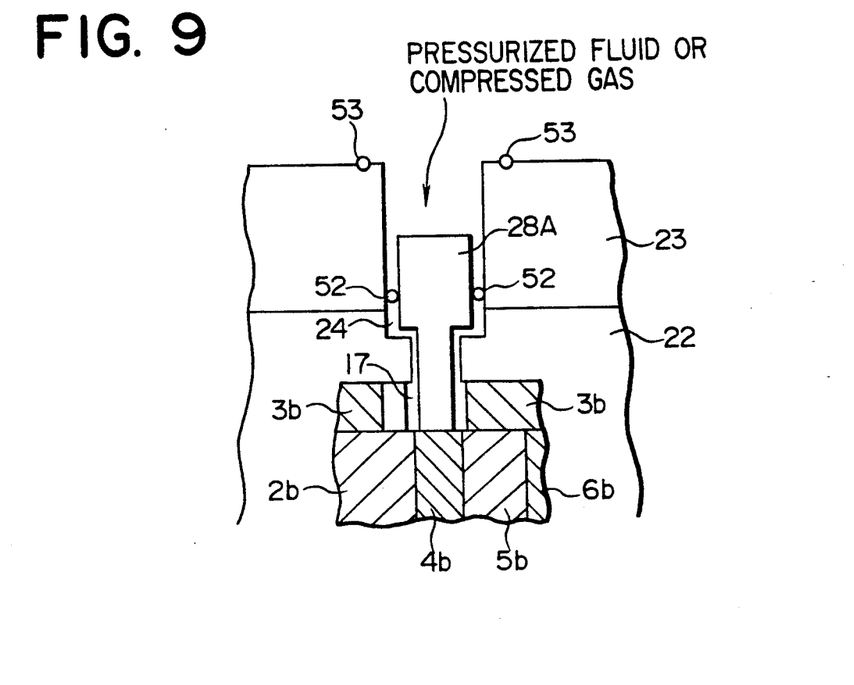
FIG. 9 is a partial sectional view of a fourth embodiment of a mold according to the present invention.

FIG. 9 is a partial sectional view of the mold corresponding to that of FIGS. 2 and 7. In this mold, a pressurized fluid such as fluid oil or a compressed gas such as compressed air, which presses the molding component 4b through the pressing pin 28A, functions as a pressing means. O rings 52 and 53 are attached to the wall of the hole to hermetic seal the pressurized fluid or the compressed gas.

Other pressing means such as electromagnets and/or permanent magnets can also be applied.

An excessive molding clamping force does not act on the above pressing means, and as a result, a short time deterioration is prevented.

As seen from the above embodiments, the holding force for holding the pins of the molding cores disposed in the cavity of the mold, is provided by a pressing means free from the molding clamping force. A a result, it becomes possible for the pins of the molding cores to be held by the optimum force and it is possible to hold the pins of the molding cores precisely at a fixed position without looseness, and the molding precision of the molded ferrule can be sufficiently improved.

Further, since the pins of the molding cores are not subjected to an excessive force such as the molding clamping force, the pins are not damaged, and therefore, the molding cores can be used for a long period, and the present invention is extremely advantageous on economy.

Figure 10A:
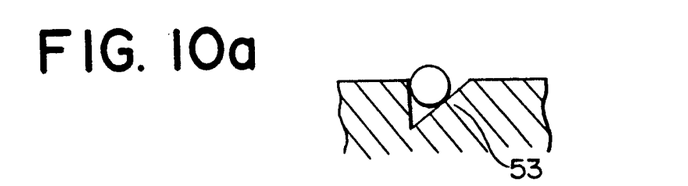
FIGS. 10a to 10c are sectional views of modifications of a positioning groove in FIG. 3.
Figure 10B:
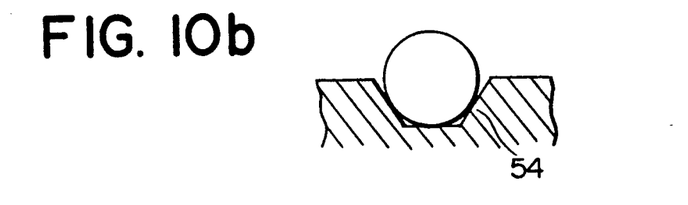
Figure 10C:
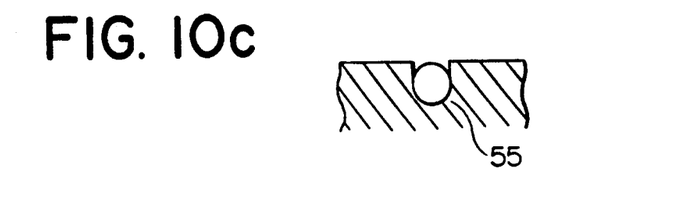

FIGS. 10a to 10c are sectional views of modifications of the V-shaped grooves 11a as shown in FIGS. 2 to 5. FIG. 10a shows a semi V-shaped groove 53, FIG. 10b shows a trapezoid groove 54, and FIG. 10c shows a U-shaped groove 55. Other grooves similar to these can be applied.

Figure 11:
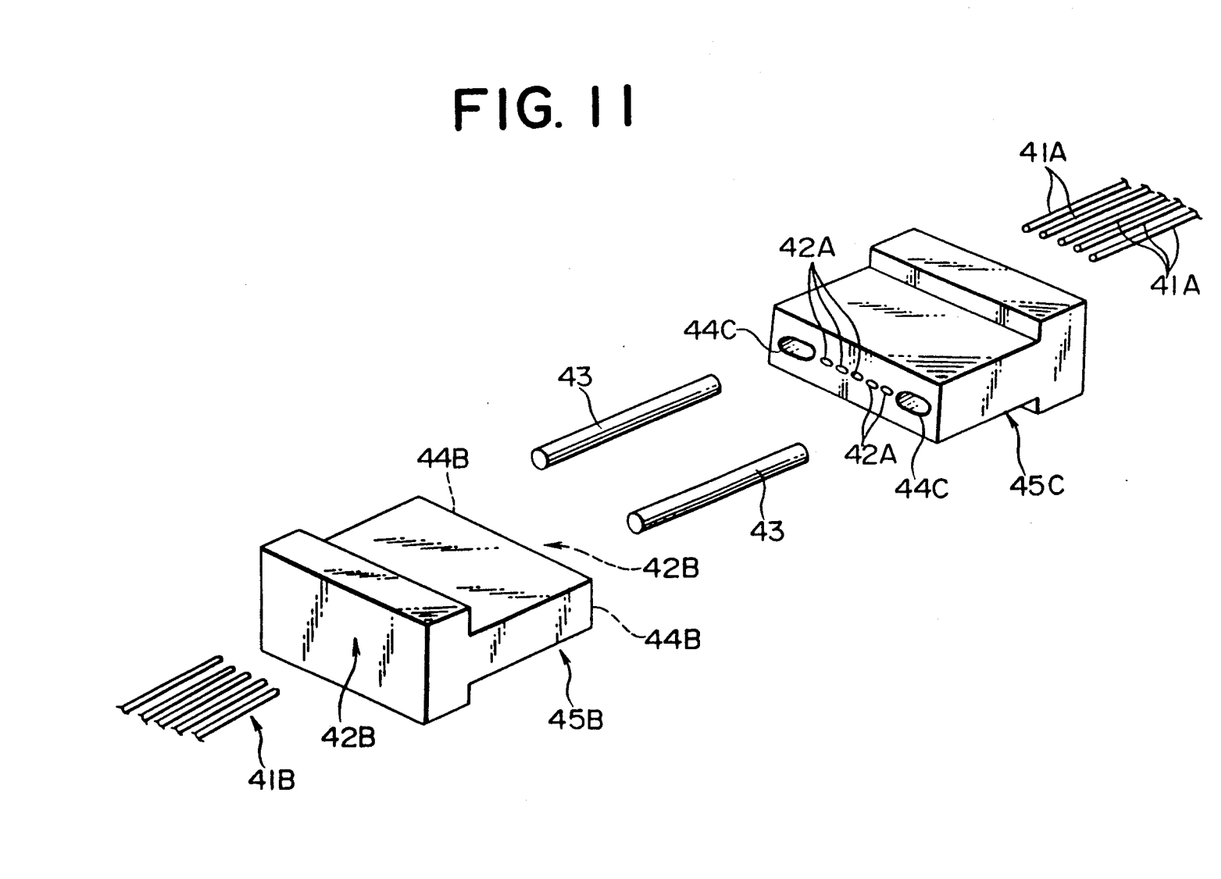
FIG. 11 is a perspective view of a pair of ferrules for an optical fiber switch.

Another ferrule of the present invention will be described with reference to FIG. 11 and FIGS. 12a and 12b. These ferrules are used for an optical fiber switch.

The optical fiber switch is comprised of a first ferrule 45c and a second ferrule 45B. The second ferrule 45B has a structure identical to that shown in FIG. 1. The first ferrule 45c has a structure similar to the ferrule 45A except that a pair of elongated through holes 44C are formed instead of the round through holes 44A. The formation of the first and second ferrules 44C and 44B can be carried out by using the mold in the same way discussed above.

When assembling the optical fiber switch, the optical fibers 41A are inserted into the fiber holes 42A, while the optical fibers 41B are inserted into the fiber holes 42B, and then the fitting pins 43 are inserted into the pin holes 44C and the pin holes 44B, to integrate the ferrules 44C and 44B.

Figure 12A:
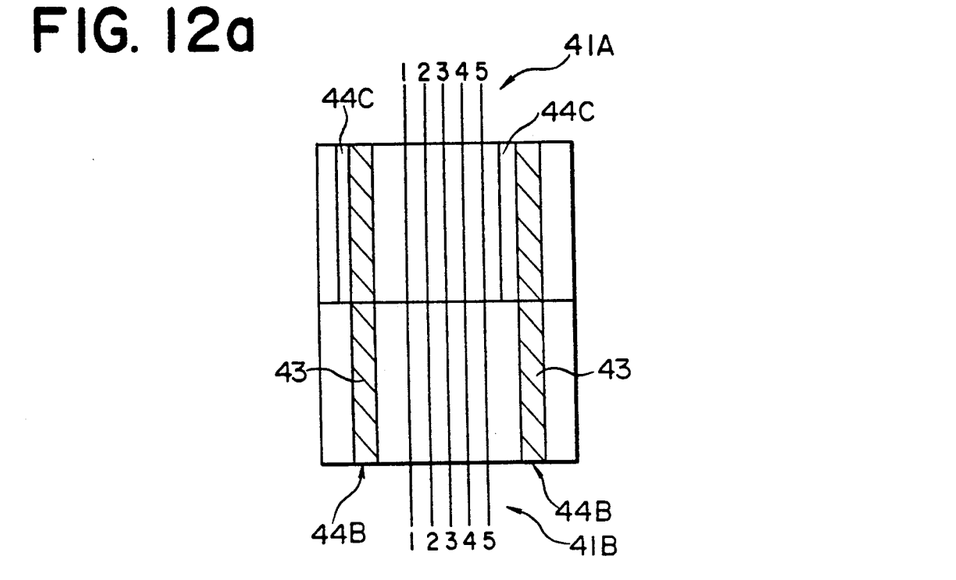
FIGS. 12a and 12b are plan views explaining modes of switching of the optical fiber switch shown in FIG. 11.
Figure 12B:
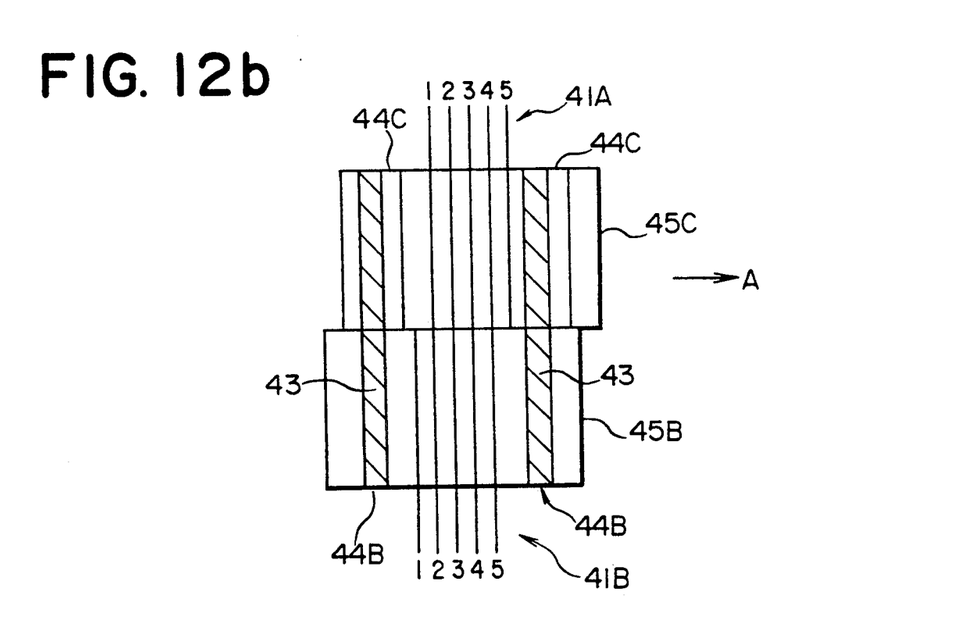

In a normal condition wherein the both ferrules 44C and 44B face at a right position, as shown in FIG. 12a, ends of all of the optical fibers 41A and 41B face each other to establish five optical paths. When the first ferrule 45C is moved by one pitch defining a distance between adjacent optical fibers, in a direction A, the fitting pins 43 are moved to left side edges of the elongated holes 44C, to thereby change the above optical paths, as shown in FIG. 12b.

Many widely different embodiments of the present invention may be constructed without departing from the spirit and scope of the present invention, and it should be understood that the present invention is not restricted to the specific embodiments described above.

We claim:

1. A method of molding a ferrule of plastic resin wherein the ferrule is provided with at least one hole having a small diameter and positioned at a predetermined position by a mold having a pair of mold halves and inner members, at least one of said inner members being a positioning member, comprising the steps of:

arranging said inner members in a first cavity defined by said pair of mold halves;

arranging at least one molding member in a second cavity defined by said inner members whereby said molding member is held in a predetermined position by said positioning member, said molding member forming said hole having the small diameter after completion of molding;

holding said mold halves by a clamping force during molding, said positioning member being free from subjection to the clamping force;

pressing said positioning member by a force separate from and smaller than said clamping force; and supplying a plastic resin into said second cavity.

2. A method of molding a ferrule according to claim 1, wherein said pressing is carried out by a force generated by a member which generates the force in response to electric power.

3. A method of molding a ferrule acording to claim 1, wherein said pressing is carried out by a force generated by an elastic member.

4. A method of molding a ferrule according to claim 1, wherein said pressing is carried out by a force generated by a pressurized fluid.

5. A method of molding a ferrule according to claim 1, wherein said pressing is carried out by a force generated by a compressed gas.

6. A method of molding a ferrule according to claim 1, wherein said pressing is carried out by a force generated by a magnet.

7. A mold for forming a ferrule provided with at least one hole having a small diameter and positioned at a predetermined position, comprising:
at least one molding member for forming said at least one hole;
a pair of mold halves defining a first cavity;
a plurality of inner members arranged in said first cavity, said inner members including at least one positioning member for positioning said at least one molding member;
a second cavity defined by said inner members, said at least one molding member being disposed in said second cavity;
means for applying a clamping force to said pair of mold halves to hold said mold halves together without subjecting said positioning member to said clamping force;
a pressing means for applying a force to said positioning member which is smaller than the clamping force and is separate from the clamping force; and
means for supplying a plastic resin to said second cavity to thereby form said ferrule.

8. A mold for forming a ferrule according to claim 7, wherein said pressing means comprises a member which generates the force in response to electric power.

9. A mold for forming a ferrule according to claim 7, wherein said pressing means comprises an elastic member.

10. A mold for forming a ferrule according to claim 7, wherein said pressing means comprises a pressurized fluid.

11. A mold for forming a ferrule according to claim 7, wherein said pressing means comprises a compressed gas.

12. A mold for forming a ferrule according to claim 7, wherein said pressing means comprises a magnet means.

13. A mold for forming a ferrule according to claim 7, wherein said inner member comprise a groove having at least one inclined surface.

14. A mold for forming a ferrule according to claim 7, wherein said ferrule is used for an optical fiber connector, or an optical fiber switch, and
said hole having a small diameter is formed to fit an optical fiber passing therethrough.

15. A mold for forming a ferrule according to claim 7, which further comprises at least one additional molding member in the form of a pin member for forming another hole through which a connecting pin is inserted.

* * * * *

UNITED STATES PATENT AND TRADEMARK OFFICE
CERTIFICATE OF CORRECTION

PATENT NO. : 5,269,998
DATED : December 14, 1993
INVENTOR(S) : KIOCHI TAKAGI et al.

It is certified that error appears in the above-identified patent and that said Letters Patent is hereby corrected as shown below:

Column 5, line 12, after "clamped" insert --with--;

line 28, delete "," and substitute --. At the top of the stationary mold 22,--;

\*      line 43, delete "hold" and substitute --hole--.

Column 7, line 18, after "the" delete "a";

line 54, delete first instance of "A" and substitute --As--.

Signed and Sealed this

Thirtieth Day of August, 1994

Attest:

BRUCE LEHMAN

*Attesting Officer*     *Commissioner of Patents and Trademarks*